United States Patent
Kamiya et al.

(10) Patent No.: US 12,502,415 B2
(45) Date of Patent: Dec. 23, 2025

(54) ORAL COMPOSITION

(71) Applicants: TOYO SHINYAKU CO., LTD., Fukuoka (JP); Muhammed Majeed, Karnataka (IN)

(72) Inventors: Tomoyasu Kamiya, Fukuoka (JP); Masamori Iwase, Saga (JP); Muhammed Majeed, Karnataka (IN)

(73) Assignees: Toyo Shinyaku Co., Ltd., Fukuoka (JP); Muhammed Majeed, Karnataka (IN)

( * ) Notice: Subject to any disclaimer, the term of this patent is extended or adjusted under 35 U.S.C. 154(b) by 513 days.

(21) Appl. No.: 17/760,049

(22) PCT Filed: Feb. 3, 2021

(86) PCT No.: PCT/JP2021/003994
§ 371 (c)(1),
(2) Date: Aug. 3, 2022

(87) PCT Pub. No.: WO2021/157627
PCT Pub. Date: Aug. 12, 2021

(65) Prior Publication Data
US 2023/0077004 A1    Mar. 9, 2023

(30) Foreign Application Priority Data

Feb. 4, 2020 (JP) ................. 2020-017492
Dec. 9, 2020 (JP) ................. 2020-204213

(51) Int. Cl.
*A61K 36/00* (2006.01)
*A61K 31/194* (2006.01)
*A61K 36/38* (2006.01)
*A61P 43/00* (2006.01)

(52) U.S. Cl.
CPC ............ *A61K 36/38* (2013.01); *A61K 31/194* (2013.01); *A61P 43/00* (2018.01)

(58) Field of Classification Search
CPC .................................................. A61K 36/38
See application file for complete search history.

(56) References Cited

U.S. PATENT DOCUMENTS

| 5,972,357 A | 10/1999 | Yamaguchi et al. |
| 2013/0281544 A1 | 10/2013 | Majeed |
| 2014/0314729 A1* | 10/2014 | Patel .................. A61K 36/42 424/94.1 |
| 2019/0166896 A1 | 6/2019 | Nam |

FOREIGN PATENT DOCUMENTS

| IN | 201621001661 A | 7/2017 |
| JP | S62-143678 | 6/1987 |
| JP | H11-29465 | 2/1999 |
| JP | 2012-031080 | 2/2012 |
| JP | 2014-502621 | 2/2014 |
| JP | 5980228 | 8/2016 |
| JP | 6446162 | 12/2018 |
| WO | 2014/077135 | 5/2014 |

OTHER PUBLICATIONS

International Search Report dated Mar. 23, 2021, in PCT/JP2021/003994, with English translation, 7 pages.
Fujimaru et al., ["Gastric mucosal injury due to alcohol in turmeric, liver extract, beverages containing lactic acid bacteria and effect on alcohol absorption"], Japanese Journal of Medicine and Pharmaceutical Science, vol. 76, No. 1, 2019, pp. 57-62.
Panda et al, "Antioxidant and hepatoprotective effect of Garcinia indica fruit rind in ethanol-induced hepatic damage in rodents", Interdisciplinary Toxicology, vol. 5, No. 4, 2012, pp. 207-213.
Written Opinion dated Mar. 23, 2021, in PCT/JP2021/003994, 4 pages,.
Yamaguchi et al., "Free Radical Scavenging Activity and Antiulcer Activity of Garcinol from Garcinia indica Fruit Rind", J. Agric. Food Chem., vol. 48, No. 6 2000, pp. 2320-2325.
Wei Pei, et al., "Gua Sha Cure All Diseases", Science and Technology Press, p. 210, 2009, 07, p. 210, first Edition, 6 pages, with English translation.
Chinese Office Action issued in corresponding Chinese patent application No. 202180012850.1, on Apr. 11, 2024, 18 pages, with machine English translation.
Japanese Office Action issued in Corresponding Patent Application No. 2020-204213 on Nov. 25, 2024, 10 pages, with machine English translation.
Japanese Office Action issued in Corresponding Patent Application No. 2020-204213 on Apr. 28, 2025, 9 pages, with machine English translation.
Japanese Society of Food Science and Technology, a new function leading to hangover improvement is confirmed in a turmeric extract containing "Bisaklon", Sep. 1, 2014, [online], Sep. 1, 2014, [searched on Apr. 23, 2025],Internet (<URL: https://housefoods - group.com/newsrelease/20140901ukon.pdf >), 4 pages, with machine English translation.
Korean Office Action issued in Corresponding Patent Application No. 10-2022-7026889 on Feb. 1, 2025, 11 pages, with machine English translation.
Jagtap et al., A Phytopharmacological Review on Garcinia indica. International Journal of Herbal Medicine. 2015, vol. 3, No. 4, pp. 02-07.
Chinese Office Action issued in corresponding Chinese patent application No. 202180012850.1, issued on Aug. 10, 2023, 17 pages, with English translation.

(Continued)

*Primary Examiner* — Qiuwen Mi
(74) *Attorney, Agent, or Firm* — Grüneberg and Myers PLLC

(57) ABSTRACT

The present invention relates to a composition for recovering from and/or alleviating a hangover, containing *Garcinia indica*. The composition for recovering from and/or alleviating a hangover of the present invention has an excellent recovery and/or alleviation effect on a hangover, and thus the composition for recovering from and/or alleviating a hangover has high industrial usefulness.

7 Claims, No Drawings

(56) References Cited

OTHER PUBLICATIONS

Shufunotomo Co., Ltd., "Self-Care Acupuncture and Home Remedies a Practical Guide to Family Acupoint Massage", Hangovers, motion sickness Discomfort symptoms Part 2, Liaoning Science and Technology Press, 2007, First Edition, 5 pages.
Quanlin, Song, "Illustrated Herbal Tea", Traditional Chinese Medicine Ancient Books Publishing House, first Edition, 2016, 4 pages, with machine English translation.
Japanese Information Offer issued in Corresponding Patent Application No. 2020-204213 Sep. 9, 2021, 16 pages, with machine English translation.
Health industrial distribution newspaper, Health Industry Marketing News Online, Healthy Liver (liver function protection) , Sep. 19, 2017, 2 pages, with machine English translation.
House Foods Group Headquarters "New function that leads to improvement of sickness on two days in a wicon extract containing Hisa Care", Japan Food Science and Engineering Society, 2013, 8 pages, with machine English translation.
Public Relations Magazine Health Club, Publication Health Club, in order to enhance the function of the hepatic function of the Japanese SouthTohoku Medical Club, Mar. 2012, 5 pages, with machine English translation.
Meijidori Clinic, "Clinic liver function improved drip"Meiji-dori Clinic Archive Oct. 22, 2019, Internet Archive Wayback Machine, archive date: Oct. 22, 2019, 22 pages, (with English abstract).
Van de Loo, et al., "The Inflammatory Response to Alcohol Consumption and Its Role in the Pathology of Alcohol Hangover.", Journal of Clinical Medicine, Jul. 2, 2020, 12 pages.

\* cited by examiner

ORAL COMPOSITION

CROSS-REFERENCE TO RELATED APPLICATIONS

This application is the National Stage entry under § 371 of International Application No. PCT/JP2021/003994, filed on Feb. 3, 2021, and which claims the benefit of priority to Japanese Application No. 2020-017492, filed on Feb. 4, 2020, and priority to Japanese Application No. 2020-204213, filed on Dec. 9, 2020. The content of each of these applications is hereby incorporated by reference in its entirety.

BACKGROUND OF THE INVENTION

Technical Field

The present invention relates to a composition for recovering from and/or alleviating a hangover, containing *Garcinia indica*.

Background Art

In general, a hangover means physical and mental discomfort that appears on the next day after drinking, and as specific examples of symptoms, headache, nausea, languor, sleepiness, upset stomach, feeling sick, diarrhea, inappetence, trembling, fatigue, dry mouth, and a decrease in athletic performance have been known. Acetaldehyde, which is a causative substance of the hangover, has strong toxicity, and when acetaldehyde is generated in a process of alcohol metabolism, dehydration symptoms, gastrointestinal disorders, and the like are caused by the toxicity of acetaldehyde.

As a material effective for recovering from and alleviating a hangover, a turmeric extract (Patent Literature 1), a hazelnut extract, a Japanese alder stem extract, and a Japanese Rowan fruit extract (Patent Literature 2) have been known. However, another material is desired to be developed, for example, for the reasons that the turmeric extract is hesitated to be ingested due to a unique flavor thereof, and that the turmeric extract is likely to adhere to a manufacturing machine and is difficult to be cleaned.

CITATION LIST

Patent Literature

Patent Literature 1: JP-A-2012-31080
Patent Literature 2: Japanese Patent No. 6446162

SUMMARY OF INVENTION

Technical Problem

An object of the present invention is to provide a composition for recovering from and/or alleviating a hangover, containing *Garcinia indica*.

Solution to Problem

In order to solve the above problems, the present inventors have made intensive studies on various substances, and have found that *Garcinia indica* has a recovery and/or alleviation effect on a hangover, thereby completing the present invention.

The outline of the present invention is as follows.

<1> A composition for recovering from and/or alleviating a hangover, comprising *Garcinia indica*.
<2> The composition for recovering from and/or alleviating a hangover according to <1>, further comprising an acidulant.
<3> The composition for recovering from and/or alleviating a hangover according to <1> or <2>, wherein the composition is ingested after appearance of a hangover symptom.
<4> A method for recovering from and/or alleviating a hangover, comprising having a composition containing *Garcinia indica* ingested.
<5> The method according to <4>, wherein the composition further contains an acidulant.
<6> The method according to <4> or <5>, wherein the ingestion is performed after appearance of a hangover symptom.
<7> Use of the composition for recovering from and/or alleviating a hangover according to any one of <1> to <3> for recovering from and/or alleviating a hangover.
<8> Use of *Garcinia indica* for the manufacture of a composition for recovering from and/or alleviating a hangover.
<9> The use of *Garcinia indica* according to <8>, wherein the composition contains an acidulant.

Advantageous Effects of Invention

According to the present invention, recovery from and/or alleviation of a hangover can be expected.

DESCRIPTION OF EMBODIMENTS

Hereinafter, the present invention will be described in detail. In the present specification, a ratio on a mass basis (percentage, part, or the like) is the same as a ratio on a weight basis (percentage, part, or the like).

*Garcinia indica* (scientific name) is a plant of the genus *Fukugi* (also referred to as the genus *Mangosteen* or the genus *Garcinia*) in the family Hypericaceae. The part of *Garcinia indica* to be used in the present invention is not limited, and for example, parts selected from leaves, fruits, and other parts may be preferably combined and used. The part to be used is preferably a fruit, and particularly preferably a flesh or a pericarp, from the viewpoint of allowing for further exhibiting a recovery and/or alleviation effect on a hangover.

A processing method of *Garcinia indica* to be used in the present invention is not limited, and as *Garcinia indica* an extract or a pulverized product of *Garcinia indica* may be preferably combined and used. With respect to *Garcinia indica*, the extract is particularly preferably from the viewpoint of allowing for further exhibiting a recovery and/or alleviation effect on a hangover.

As an extraction treatment of *Garcinia indica*, a method in which an extraction solvent generally used by a person skilled in the art is added and heating is performed as necessary to obtain an extract is known. A polar solvent is often used as the extraction solvent in the extraction treatment. Examples of the polar solvent include water, methanol, ethanol, isopropanol, acetone, 1,3-butylene glycol, ethylene glycol, propylene glycol, glycerin, acetic acid, ethyl acetate, ethers, and hexane. The extraction solvent is preferably a polar solvent, more preferably water or ethanol, or a mixture of water and ethanol, from the viewpoint of allowing for further exhibiting a recovery and/or alleviation effect on a hangover, and most preferably ethanol, from the viewpoint of an excellent extraction efficiency.

In the case of extraction with a polar solvent, the extraction method is not limited and may be preferably selected from, for example, continuous extraction, immersion extraction, countercurrent extraction, and the like. In addition, any device can be used for the extraction at room temperature or under reflux heating. The extract may be concentrated as necessary to obtain a dry powder. When the extract is a dry powder, an excipient may be added as necessary. In the present specification, when the extract of *Garcinia indica* contains an excipient, a content of *Garcinia indica* is an amount excluding an amount of the excipient.

The ingestion amount per day of *Garcinia indica* is not limited, and *Garcinia indica* is preferably ingested in a range of 0.001 mg or more and 1000 mg or less in terms of dry mass, more preferably ingested in a range of 0.01 mg or more and 500 mg or less in terms of dry mass, still more preferably ingested in a range of 0.1 mg or more and 300 mg or less in terms of dry mass, yet still more preferably ingested in a range of 1 mg or more and 200 mg or less in terms of dry mass, from the viewpoint of allowing for further exhibiting a recovery and/or alleviation effect on a hangover. And, *Garcinia indica* is particularly preferably ingested in a range of 10 mg or more and 150 mg or less in terms of dry mass, and most preferably ingested in a range of 25 mg or more and 100 mg or less in terms of dry mass, from the viewpoint of emphasizing a flavor of *Garcinia indica*. *Garcinia indica* is preferably ingested orally, and the composition for recovering from and/or alleviating a hangover of the present invention (hereinafter, may be simply referred to as "composition of the present invention") is preferably an oral composition.

A blending ratio of *Garcinia indica* in the composition for recovering from and/or alleviating a hangover of the present invention is not limited, but *Garcinia indica* is preferably blended in an amount of 0.0001 mass % or more and 80 mass % or less in terms of dry mass, more preferably blended in an amount of 0.0005 mass % or more and 50 mass % or less in terms of dry mass, still more preferably blended in an amount of 0.001 mass % or more and 35 mass % or less in terms of dry mass, from the viewpoint of allowing for further exhibiting a recovery and/or alleviation effect on a hangover, and most preferably blended in an amount of 0.01 mass % or more and 20 mass % or less in terms of dry mass, from the viewpoint of modulation properties and content uniformity.

In the present invention, in addition to *Garcinia indica* described above, another material that is generally used may be contained within a range that does not impair the effects of the present invention. Such a material may be preferably selected from, for example, various excipients, binders, brighteners, lubricants, stabilizers, diluents, bulking agents, thickeners, emulsifiers, antioxidants, pH adjusters, colorants, flavors, fragrances, acidulants, additives, and the like. A content of the material other than *Garcinia indica* may be adjusted according to a dosage form and the like in the present invention.

As the other material that may be blended with the composition for recovering from and/or alleviating a hangover of the present invention, an acidulant is preferable from the viewpoint of improving the recovery and/or alleviation effect of *Garcinia indica* on a hangover. That is, the composition for recovering from and/or alleviating a hangover of the present invention preferably further contains an acidulant. As the acidulant, for example, citric acid, tartaric acid, ascorbic acid, lactic acid, acetic acid, adipic acid, succinic acid, fumaric acid, malic acid, phosphoric acid, or a salt thereof is more preferable, citric acid, tartaric acid, ascorbic acid, or a salt thereof is still more preferable, and citric acid or a salt thereof is most preferable, from the viewpoint of improving the effect of *Garcinia indica* on recovery from and/or alleviation of the hangover.

A blending ratio of the acidulant in the composition for recovering from and/or alleviating a hangover of the present invention is not limited, but the acidulant is preferably blended in an amount of 0.0001 mass % or more and 50 mass % or less in terms of dry mass, more preferably blended in an amount of 0.001 mass % or more and 25 mass % or less in terms of dry mass, from the viewpoint of allowing for further exhibiting a recovery and/or alleviation effect on a hangover, and most preferably blended in an amount of 0.01 mass % or more and 15 mass % or less in terms of dry mass, from the viewpoint of modulation properties and content uniformity. A recovery and/or alleviation effect on a hangover is further improved by combining the acidulant with *Garcinia indica* at a specific ratio, and therefore, the acidulant is preferably blended at a ratio of 0.01 parts by weight or more and 50 parts by weight or less, more preferably blended at a ratio of 0.05 parts by weight or more and 20 parts by weight or less, and most preferably blended at a ratio of 0.1 parts by weight or more and 10 parts by weight or less, relative to 1 part by weight of *Garcinia indica*.

The composition for recovering from and/or alleviating a hangover of the present invention can be produced in various dosage forms by a known production method as necessary. The dosage form may be preferably selected from, for example, a powder form, a grain form (tablet), a granular form (granule), a tablet form, a rod form, a plate form, a block form, a solid form, a pill form, a liquid form, a paste form, a slurry form, a capsule form such as a hard capsule or a soft capsule, a caplet form, a tablet form, a gel form, a chewable form, a syrup form, a stick form, and the like. Since *Garcinia indica* is less likely to adhere to a manufacturing machine and is easy to handle by an operator, a dosage form including a tablet form, a powder form, a granular form, a capsule form, a liquid form, or a slurry form is particularly preferable.

A packaging form of the composition for recovering from and/or alleviating a hangover of the present invention is not limited, but may be selected from, for example, blister packs such as PTP, strip packages, heat seal pouches, aluminum packages such as aluminum pouches, film packages using plastics, synthetic resins, and the like, glass containers such as vials, plastic containers such as ampoules, PET bottles, aluminum cans, steel cans, and the like. The packaging form is particularly preferably aluminum packages, glass containers, PET bottles, aluminum cans, or steel cans from the viewpoint of storage stability of ingredients contained in *Garcinia indica*.

The composition for recovering from and/or alleviating a hangover of the present invention has a recovery and/or alleviation effect on a hangover as is clear from the description of Examples described below. Therefore, the composition of the present invention is effective as an agent for recovering from and/or alleviating various hangover symptoms such as headache, nausea, languor, sleepiness, upset stomach, feeling sick, diarrhea, inappetence, trembling, fatigue, dry mouth, and a decrease in athletic performance which are associated with drinking. The composition of the present invention can be used for recovering from and/or alleviating one or two or more symptoms selected from these hangover symptoms. The composition for recovering from and/or alleviating a hangover of the present invention is particularly used for recovering from and/or alleviating one or two or more symptoms selected from headache, nausea, sleepiness, inappetence, upset stomach, fatigue, and dry mouth (thirst), and is particularly used for recovering from and/or alleviating headache, nausea, inappetence, fatigue, and dry mouth.

In the present invention, the term "recovering from a hangover" means that a drunk person recovers from a symptom of a hangover by ingesting the composition of the present invention and returns to a state of being not drunk (state without subjective symptoms of a hangover). In the present invention, the term "alleviating a hangover" means that a symptom of a hangover is reduced by ingestion of the composition of the present invention as compared with a case where the composition of the present invention is not ingested. A timing at which the composition of the present invention is ingested is preferably after a person to ingest the composition is aware of a symptom of a hangover, from the viewpoint of allowing for further exhibiting a recovery and/or alleviation effect on a hangover. That is, the composition for recovering from and/or alleviating a hangover of the present invention is preferably ingested after the appearance of a hangover symptom.

The composition of the present invention may be sold as a product used for the recovering from and/or alleviating a hangover. The effect and efficacy of the product can be preferably indicated in any place of the product, for example, a main body, a package, an instruction, an advertisement, and the like of the product. In addition, an active ingredient to be indicated is not limited to *Garcinia indica* as long as the product is effective for recovering from and/or alleviating a hangover. For example, another material and *Garcinia indica* may also be combined and indicated as the active ingredient, or only the other material may also be indicated as the active ingredient without indicating *Garcinia indica* as the active ingredient.

Specifically, products that contain the composition of the present invention and are used for recovering from and/or alleviating a hangover are sold as medicines (including quasi-drugs) and so-called health foods. For the so-called health foods, examples of methods for indicating the effect and efficacy of the products include indication methods for recovering from and/or alleviating symptoms associated with alcohol ingestion or a hangover, such as "recovery from and/or alleviation of fatigue or a feeling of weakness", "recovery from and/or alleviation of headache or a feeling of unease in head", "recovery from and/or alleviation of gastrointestinal disorders", "recovery from and/or alleviation of a feeling of unease in stomach, discomfort of stomach, upset stomach, or diarrhea", "recovery from and/or alleviation of sleepiness", "recovery from and/or alleviation of poor concentration or poor attention", "recovery from and/or alleviation of nausea", "recovery from and/or alleviation of dry mouth", "recovery from and/or alleviation of dry throat", "recovery from and/or alleviation of a feeling of unease in muscle", "recovery from and/or alleviation of muscle pain", "recovery from and/or alleviation of dizziness", "recovery from and/or alleviation of depression or anxiety", "recovery from and/or alleviation of trembling of hands", and "recovery from and/or alleviation of inappetence".

The term "recovery from and/or alleviation of a hangover" refers to recovery from and/or alleviation of generally known hangover symptoms as described above, and is a use different from the protection of the liver (liver and hepatocytes). The protection of the liver means a recovery and/or alleviation action on hepatic disorders, that is, hepatic fibrosis and cirrhosis or liver cancer, and also means protection of viral hepatitis or a non-alcoholic fatty liver disease (fat deposition in the liver, etc.) which is a cause of the hepatic disorder. For example, in a rat whose hepatic disorder is induced by a toxin such as carbon tetrachloride, when an action of suppressing expression of TGF-β or a C-reactive protein is confirmed, it can be said that a liver protection action is exhibited, but it cannot be said that a recovery and/or alleviation action on a hangover is exhibited. This is because the hangover is caused by dehydration symptoms associated with a diuretic action of alcohol, or hypoglycemia associated with suppression of metabolism of a substance other than alcohol in the liver, whereas TGF-β and a C-reactive protein are genes whose expression increases in a state with hepatic fibrosis and infectious diseases, and therefore, recovery from and/or alleviation of a hangover does not occur even if the expression of the TGF-β and a C-reactive protein is suppressed. As described above, the protection of the liver and the recovery from and/or alleviation of a hangover are different in uses and action mechanisms, and there is no direct causal relationship therebetween.

The composition for recovering from and/or alleviating a hangover of the present invention may be ingested as it is, or a liquid obtained by extracting the composition for recovering from and/or alleviating a hangover with cold water, hot water, or the like may also be ingested.

EXAMPLES

Hereinafter, the present invention will be described in more detail with reference to Examples, but the present invention is not limited to these Examples, and the present invention can take various forms as long as the problems of the present invention can be solved.

Example 1

[Preparation of *Garcinia indica* Extract]

A part (flesh and pericarp) obtained by removing seeds from fruits of *Garcinia indica* was dried and then extracted with ethanol at 70° C. or higher for 6 hours or longer. In order to remove impurities from the obtained extraction liquid, the extraction liquid was filtered and concentrated. The concentrated extraction liquid was processed into a powder to obtain a *Garcinia indica* extract in the powder form.

[Preparation of Sample]

Tablets each of which was 250 mg and contained 5 mass % of the *Garcinia indica* extract were prepared (Example 1). The tablets were compression-molded by a rotary tablet press (other tablets described below were produced in the same manner). As an excipient, cellulose, reduced maltose, and calcium stearate were appropriately blended. An aluminum package was filled with two of the prepared tablets to prepare a sample. That is, one package of the sample contained 25 mg of the *Garcinia indica* extract.

[Evaluation of Samples]

Ten healthy adults were randomly selected as subjects, and a questionnaire (pre-ingestion questionnaire) was conducted with regard to whether a symptom of a hangover was recognized on the next morning after drinking (9 hours after drinking). In the pre-ingestion questionnaire, five items of headache, nausea, languor, sleepiness, and upset stomach were evaluated in four stages of 1. felt a hangover symptom strongly; 2. felt a hangover symptom; 3. felt a hangover symptom slightly; and 4. not felt a hangover symptom. It was determined that a symptom of a hangover was recognized for a subject who answered any one of 1 to 3 in at least one of the items.

As a result of the pre-ingestion questionnaire, it was found that a symptom of a hangover was recognized in all the subjects. Thereafter, each subject was allowed to ingest one package of the sample (2 tablets; 25 mg of the *Garcinia indica* extract) together with 100 mL of water. A questionnaire about recovery from and/or alleviation of a hangover from the sample ingestion to 3 hours later (post-ingestion questionnaire) was evaluated based on evaluation items in Table 1. The evaluation was performed with reference to the evaluation before the sample ingestion. In the post-ingestion questionnaire, subjects who answered 1 (become very good) or 2 (become good) in one or more items were determined to have recovered from a hangover and/or have an alleviated hangover.

In addition, among the five evaluated items, a ratio of items in which a subject recovered from a symptom of a hangover and/or a symptom of a hangover was alleviated, that is, a ratio of items in which the subjects answered the answer 1 (become very good) or 2 (become good) in the questionnaire was evaluated as a recovery degree and/or an alleviation degree (%). The calculation formula of the recovery degree and/or alleviation degree of hangover symptoms is as follows.

Recovery degree and/or alleviation degree (%)= (number of evaluation items in which a hangover was recovered and/or was alleviated in questionnaire results of all subjects)/(number of evaluation items×number of subjects)×100

TABLE 1

| Headache | 1. Become very good | 2. Become good | 3. Not change compared with pre-ingestion | 4. Become poor |
|---|---|---|---|---|
| Nausea | 1. Become very good | 2. Become good | 3. Not change compared with pre-ingestion | 4. Become poor |
| Languor | 1. Become very good | 2. Become good | 3. Not change compared with pre-ingestion | 4. Become poor |
| Sleepiness | 1. Become very good | 2. Become good | 3. Not change compared with pre-ingestion | 4. Become poor |
| Upset stomach | 1. Become very good | 2. Become good | 3. Not change compared with pre-ingestion | 4. Become poor |

[Results]

The results of the questionnaire are shown in Table 2. For nine of ten subjects (90%) who ingested the sample after drinking, a recovery and/or alleviation effect on a hangover was recognized. In the five items, the recovery degree and/or the alleviation degree indicating the ratio of the items in which a subject recovered from a hangover and/or a hangover was alleviated was 44%. From this, it was found that *Garcinia indica* had a recovery and/or alleviation effect on a hangover. It should be noted that the symbol "A" in rows of "recovery and/or alleviation determination" in Tables 2 to 4 indicates that there is one or more items in which the subject answered 1 (become very good) or 2 (become good) in the post-ingestion questionnaire of the subjects in a corresponding column, that is, the subject recovered from the hangover and/or the hangover was alleviated. The symbol "B" indicates that there is no item in which the subject answered 1 (become very good) or 2 (become good) in the post-ingestion questionnaire of the subjects in a corresponding column, that is, the subject did not recover from the hangover and/or the hangover was not alleviated.

TABLE 2

| Subject No | 1 | 2 | 3 | 4 | 5 | 6 | 7 | 8 | 9 | 10 |
|---|---|---|---|---|---|---|---|---|---|---|
| Headache | 2 | 3 | 2 | 2 | 3 | 2 | 3 | 2 | 2 | 3 |
| Nausea | 3 | 3 | 2 | 2 | 3 | 2 | 3 | 3 | 2 | 3 |
| Languor | 2 | 3 | 1 | 3 | 1 | 3 | 2 | 3 | 3 | 2 |
| Sleepiness | 3 | 3 | 3 | 3 | 2 | 3 | 1 | 3 | 3 | 2 |
| Upset stomach | 3 | 3 | 3 | 2 | 2 | 2 | 2 | 3 | 3 | 3 |
| Recovery and/or alleviation determination | A | B | A | A | A | A | A | A | A | A |

Comparative Example 1

[Preparation of Sample]

A caramel pigment was employed as a material having an appearance (color) similar to that of *Garcinia indica*, and tablets each of which was 250 mg and contained 10 mass % of the caramel pigment were prepared (Comparative Example 1). As an excipient, cellulose, reduced maltose, and calcium stearate were appropriately blended. In addition, maltose and silicon dioxide were also blended. An aluminum package was filled with two of the prepared tablets in the same manner as in Example 1.

[Evaluation of Sample]

Six healthy adults were randomly selected as subjects and evaluated in the same manner as in Example 1. On the next day after drinking, each subject was allowed to ingest one package of the sample (2 tablets; not containing the *Garcinia indica* extract) together with 100 mL of water. A questionnaire about recovery from and/or alleviation of a hangover from sample ingestion to 3 hours later was conducted. A symptom of a hangover was recognized for all the subjects on the next day after drinking.

[Results]

As shown in Table 3, for one of the six subjects (16.7%), the recovery and/or alleviation effect was recognized. The recovery degree and/or alleviation degree of a hangover was 3.3%.

TABLE 3

| Subject No | 11 | 12 | 13 | 14 | 15 | 16 |
|---|---|---|---|---|---|---|
| Headache | 3 | 3 | 2 | 3 | 3 | 3 |
| Nausea | 3 | 3 | 3 | 3 | 3 | 3 |
| Languor | 3 | 3 | 3 | 3 | 3 | 3 |
| Sleepiness | 3 | 3 | 3 | 3 | 3 | 3 |
| Upset stomach | 3 | 3 | 3 | 3 | 3 | 3 |
| Recovery and/or alleviation determination | B | B | A | B | B | B |

Comparative Example 2

[Preparation of Sample]

An aluminum package was filled, in the same manner as in Example 1, with one tablet containing a turmeric extract marketed as a supplement for the purpose of recovery from and/or alleviation of a hangover and one tablet produced in Comparative Example 1 (a tablet in which neither the turmeric extract nor the *Garcinia indica* extract was blended) (Comparative Example 2). Since the marketed product prepared was a 300 mg tablet containing 16.7% of the turmeric extract, the sample in Comparative Example 2 contained 50 mg of the turmeric extract per package.
[Evaluation of Sample]
Eight healthy adults were randomly selected as subjects and evaluated in the same manner as in Example 1. On the next day after drinking, each subject was allowed to ingest one package of the sample (2 tablets; 50 mg of the turmeric extract) together with 100 mL of water. A questionnaire was conducted on recovery from and/or alleviation of a hangover from sample ingestion to 3 hours later. A symptom of a hangover was recognized for all the subjects on the next day after drinking.
[Results]
As shown in Table 4, for six of the eight subjects (75%), the recovery and/or alleviation effect on a hangover was recognized. The recovery degree and/or alleviation of a hangover was 32.5%.

TABLE 4

| Subject No | 17 | 18 | 19 | 20 | 21 | 22 | 23 | 24 |
|---|---|---|---|---|---|---|---|---|
| Headache | 3 | 2 | 3 | 2 | 2 | 3 | 3 | 3 |
| Nausea | 3 | 3 | 2 | 3 | 3 | 3 | 2 | 3 |
| Languor | 2 | 3 | 3 | 2 | 3 | 3 | 2 | 3 |
| Sleepiness | 2 | 3 | 2 | 2 | 3 | 3 | 3 | 3 |
| Upset stomach | 3 | 3 | 2 | 2 | 3 | 3 | 3 | 3 |
| Recovery and/or alleviation determination | A | A | A | A | A | B | A | B |

As shown in Tables 2 to 4, the tablet (Example 1) containing the *Garcinia indica* extract was effective for all of the items of headache, nausea, languor, sleepiness, and upset stomach after drinking as compared with Comparative Examples 1 and 2 containing no *Garcinia indica*. Therefore, it was found that the tablet in Example 1 caused recovery from and/or alleviation of a hangover. In addition, as compared with Comparative Example 2 containing the turmeric extract, Example 1 was superior in all the evaluation items and showed a higher value in terms of the ratio at which the recovery from and/or alleviation of a hangover was recognized and an average value of the recovery degree and/or the alleviation degree. The amount of the *Garcinia indica* extract contained in Example 1 was 25 mg, whereas the amount of the turmeric extract contained in Comparative Example 2 was 50 mg. However, a higher recovery and/or alleviation effect on a hangover was recognized in Example 1 as compared with Comparative Example 2. Therefore, it was found that *Garcinia indica* had an extremely excellent recovery and/or alleviation effect on a hangover.

Examples 2 and 3 and Comparative Example 3

[Preparation of Sample]
Samples of Examples 2 and 3 and Comparative Example 3 were prepared as follows.
Example 2: The *Garcinia indica* extract used in Example 1 and an excipient were mixed, and then, the mixture was compression-molded with a rotary tablet press to prepare tablets each of which was 250 mg and contained 15.4 mass % of the *Garcinia indica* extract. As an excipient, cellulose, reduced maltose, and calcium stearate were appropriately blended. An aluminum package was filled with one of the prepared tablets to prepare a sample. That is, one package of the sample contains 38.5 mg of the *Garcinia indica* extract.
Example 3: The *Garcinia indica* extract used in Example 1 and an excipient were mixed, and then, the mixture was compression-molded with a rotary tablet press to prepare tablets each of which was 250 mg and contained 31 mass % of a *Garcinia indica* extract. As an excipient, cellulose, reduced maltose, and calcium stearate were appropriately blended. An aluminum package was filled with one of the prepared tablets to prepare a sample. That is, one package of the sample contains 77.5 mg of the *Garcinia indica* extract.
Comparative Example 3: A caramel pigment was used in order to make it impossible to distinguish a sample in Comparative Example 3 from the samples of Examples 2 and 3 in appearance. The caramel pigment and an excipient were mixed, and then, the mixture was compression-molded with a rotary tablet press to prepare tablets each of which was 250 mg and contained 20 mass % of the caramel pigment. As an excipient, cellulose, reduced maltose, and calcium stearate were appropriately blended. In addition, maltose and silicon dioxide were also blended. An aluminum package was filled with one of the prepared tablets to prepare a sample.
[Evaluation of Sample]
As subjects, 34 healthy adult men who were likely to have a hangover were selected, and three groups of crossover tests were performed. When a subject who was likely to have a hangover was selected, pre-screening was performed, and a person who had a remarkable hangover symptom after ingestion of alcohol was preferentially selected as a subject. On the next morning after drinking (7 hours after drinking), a questionnaire for evaluating a symptom of a hangover was conducted (pre-ingestion questionnaire). The questionnaire included two items of fatigue and loss of appetite, and a score evaluation of 8 levels of 0 to 7 was performed on each symptom with reference to an evaluation index of acute hangover scale (AHS), which is used for evaluating hangover symptoms. Specifically, a case where a subject did not feel hangover symptoms at all was defined as 0, and a case where a subject felt any hangover symptom was set to 7 levels of 1 to 7 (1 (the subject felt a hangover symptom very weakly) to 4 (the subject felt a hangover symptom moderately) to 7 (the subject felt a hangover symptom very strongly)).
After the pre-ingestion questionnaire was filled out, each subject was allowed to ingest a sample together with 100 mL of water. After two hours after the sample ingestion, the same questionnaire was conducted (questionnaire after two hours after the ingestion). The recovery degree and/or the alleviation degree of hangover symptoms were evaluated by subtracting (score in pre-ingestion questionnaire) from (score in questionnaire after two hours after ingestion) with reference to the evaluation before ingestion of the sample.
[Results]
The results of the questionnaire are shown in Table 5. In Table 5, for each sample and each symptom, the average values of subtracting (score in pre-ingestion questionnaire) from (score in questionnaire after two hours after ingestion) with respect to a subject were summarized. A more reduced numerical value of the average value (the more increased absolute value of the average value, when the average value is a negative value) indicates that a subject recovers from symptoms of fatigue and loss of appetite more.

TABLE 5

| Test group | Fatigue | Loss of appetite |
|---|---|---|
| Example 2 | −0.9 | −0.7 |
| Example 3 | −1.0 | −0.6 |
| Comparative Example 3 | −0.4 | −0.2 |

As shown in Table 5, it was found that the tablets containing *Garcinia indica* (Examples 2 and 3) caused a subject to recover from fatigue and loss of appetite and/or alleviated fatigue and loss of appetite as compared with the tablets not containing *Garcinia indica* (Comparative Example 3). From the above results, it was found that a subject recovered from hangover symptoms and/or hangover symptoms were alleviated by ingestion of the composition of the present invention.

Examples 4 and 5 and Comparative Examples 4 and 5

[Preparation of Sample]

Samples of Examples 4 and 5 and Comparative Examples 4 and 5 were prepared as follows by using the same *Garcinia indica* extract as in Example 1.

Example 4: Granules each containing 5 mass % of the *Garcinia indica* extract and 10 mass % of an acidulant (citric acid) were prepared. As an excipient, maltodextrin was appropriately blended. An aluminum package was filled with 2000 mg of the granules to prepare a sample. That is, one package of the sample contains 100 mg of the *Garcinia indica* extract and 200 mg of the acidulant (citric acid).

Example 5: Granules each containing 5 mass % of the *Garcinia indica* extract were prepared. As an excipient, maltodextrin was appropriately blended. An aluminum package was filled with 2000 mg of the granules to prepare a sample. That is, one package of the sample contains 100 mg of the *Garcinia indica* extract.

Comparative Example 4: Granules each containing 10 mass % of an acidulant (citric acid) were prepared. As an excipient, maltodextrin was appropriately blended. An aluminum package was filled with 2000 mg of the granules to prepare a sample. That is, one package of the sample contains 200 mg of the acidulant (citric acid).

Comparative Example 5: Granules containing neither the *Garcinia indica* extract nor the acidulant (citric acid) were prepared. As an excipient, maltodextrin was appropriately blended. An aluminum package was filled with 2000 mg of the granules to prepare a sample.

[Evaluation of Sample]

Sixteen healthy adults were randomly selected as subjects, and a questionnaire (pre-ingestion questionnaire) was conducted on the next day after drinking (7.5 hours after drinking) with regard to whether a symptom of a hangover was recognized. In the pre-ingestion questionnaire, evaluation was performed on four items of headache, thirst, fatigue, and dizziness. Regarding the three items of thirst, fatigue, and dizziness, a score evaluation of 8 levels of 0 to 7 was performed on each symptom with reference to an evaluation index of acute hangover scale (AHS) used for evaluating hangover symptoms. Specifically, a case where a subject did not feel hangover symptoms at all was defined as 0, and a case where a subject felt any hangover symptom was set to 7 levels of 1 to 7 (1 (the subject felt a hangover symptom very weakly) to 4 (the subject felt a hangover symptom moderately) to 7 (the subject felt a hangover symptom very strongly)). Regarding headache, hangover symptoms were evaluated (0 (not feel a hangover symptom at all) to 100 (feel that a hangover symptom cannot be tolerated)) according to a visual analog scale (VAS) method, which was widely used for pain evaluation. A subject whose score in the pre-ingestion questionnaire was 0 (not feel a hangover symptom at all) was determined not to feel a hangover symptom and was excluded from the evaluation.

As a result of the pre-ingestion questionnaire, it was found that a symptom of a hangover was recognized in all the subjects. Thereafter, 14 subjects were divided into four groups (Example 4: 4 subjects, Example 5: 4 subjects. Comparative Example 4: 3 subjects, Comparative Example 5: 3 subjects), and each subject was allowed to ingest a sample together with 100 mL of water. After 4 hours after the sample ingestion, a questionnaire (a questionnaire after 4 hours after ingestion) including the four items was conducted again, and hangover symptoms were evaluated. The recovery degree and/or the alleviation degree of hangover symptoms were calculated by subtracting (score in pre-ingestion questionnaire) from (score in questionnaire after 4 hours after ingestion) with reference to the evaluation before ingestion of the sample, and an average value was calculated, A more reduced numerical value of the average value (the more increased absolute value of the average value, when the average value is a negative value) means that a subject has recovered from the symptoms and/or the symptoms are alleviated more.

[Results]

The questionnaire results are shown in Table 6. In any of the items of headache, thirst, fatigue, and dizziness, it was revealed that in Example 5 (a beverage containing 100 mg of the *Garcinia indica* extract), the score of a hangover symptom was more recovered and/or alleviated as compared with Comparative Example 5 (a beverage not containing the *Garcinia indica* extract). In addition, it was revealed that in Example 4 (a beverage containing 100 mg of the *Garcinia indica* extract and 200 mg of the acidulent (citric acid)), the score of a hangover symptom was more recovered and/or alleviated as compared with Example 5 (a beverage containing 100 mg of the *Garcinia indica* extract), Comparative Example 4 (a beverage containing 200 mg of the acidulant (citric acid)), and Comparative Example 5 (a beverage containing neither the *Garcinia indica* extract nor the acidulant (citric acid)). In particular, regarding fatigue, dizziness, and headache, recovery from and/or alleviation of symptoms was not observed in Comparative Example 4 (the beverage containing 200 mg of the acidulant (citric acid)), but a larger recovery and/or alleviation effect could be found in Example 4 than in any group.

TABLE 6

| Test group | Headache | Thirst | Fatigue | Dizziness |
| --- | --- | --- | --- | --- |
| Example 4 | −41.0 | −5.0 | −2.5 | −2.5 |
| Example 5 | −38.5 | −4.0 | −2.3 | −1.5 |
| Comparative Example 4 | −24.7 | −3.0 | −1.7 | −1.0 |
| Comparative Example 5 | −37.0 | −2.7 | −1.7 | −1.3 |

As shown in Table 6, it was found that a subject recovered from hangover symptoms and/or hangover symptoms were alleviated by the granules containing *Garcinia indica* (Example 5). From this, it was shown that *Garcinia indica* caused a subject to recover from hangover symptoms and/or alleviated hangover symptoms by being ingested in the form of not only tablets but also granules (beverages). In addition, the granules containing *Garcinia indica* and citric acid (Example 4) had a better recovery and/or alleviation effect on a hangover than granules containing only one of *Garcinia indica* and citric acid (Example 5 and Comparative Example 4). From this, it was revealed that an action of *Garcinia*

*indica* on recovery from and/or alleviation of a hangover was enhanced by ingesting an acidulant in combination with *Garcinia indica*.

Example 6 and Comparative Example 6

[Test Method]

Male ICR mice (10 weeks old: Japan SLC, Inc.) were habituated for 5 days, and then divided into three groups based on body weight values. The mice were divided into a group (Example 6) of seven mice to which alcohol (2000 mg/kg) and *Garcinia indica* (100 mg/kg) were administered, a group (control group) of eight mice to which neither alcohol nor *Garcinia indica* was administered, and a group (Comparative Example 6) of seven mice to which alcohol (2000 mg/kg) was administered and *Garcinia indica* was not administered.

The same *Garcinia indica* extract as in Example 1 and pure water were used to prepare a solution of *Garcinia indica* with a predetermined concentration (10 mg/mL). The alcohol was prepared to reach 12.5% (v/v) using physiological saline. After one hour after the start of a light period (8:30 to 20:30), the alcohol was intraperitoneally administered (20 mL/kg), and 6 hours later, a solution of *Garcinia indica* was forcibly orally administered (10 mL/kg). After 3 hours after the forced oral administration, the mice were subjected to an open field test for 5 minutes. In the open field test, a video was recorded by a digital camera, and an analysis was performed.

[Open Field Test]

A mouse was placed in a center of a square box of 30 cm×30 cm×30 cm, and allowed to freely behave for 5 minutes. As for the behavior of the mouse, a video was recorded by a digital camera, and an analysis with two indices was performed.

Index 1 (the number of times of movement): The open field was equally divided into 3×3 areas, that is, a total of nine areas, and the number of times of passing in the areas was counted and defined as the number of times of movement.

Index 2 (the number of times of entering center): The number of times of entering a center area (30% of the entire area) of the open field was counted and defined as the number of times of entering center.

For each of the number of times of movement and the number of times of entering center, a relative value with reference to the control group was calculated. An increased numerical value indicates that the drunk symptoms caused by alcohol are alleviated.

TABLE 7

| Test group | Number of times of movement (relative value to control group) | Number of entering center (relative value to control group) |
|---|---|---|
| Example 6 (*garcinia indica* group 100) | 80.2 | 96.4 |
| Comparative Example 6 (group without *garcinia indica* administration) | 55.8 | 54.8 |

The test results are shown in Table 7. For the group (Comparative Example 6) to which only alcohol was administered and *Garcinia indica* was not administered, the number of times of movement and the number of times of entering center were reduced as compared with the group (control group) to which neither alcohol nor *Garcinia indica* was administered. Based on this result, it was suggested that a hangover was caused by the administration of alcohol, and the number of times of movement and the number of times of entering center were reduced. Further, for the group (Example 6) to which *Garcinia indica* was also administered together with alcohol, the number of times of movement and the number of times of entering center were increased as compared with Comparative Example 6, and it was found that a subject recovered from a hangover and/or a hangover was alleviated. Therefore, it was found that *Garcinia indica* is effective for recovering from and/or alleviating a hangover.

Example 7 and Comparative Examples 7 and 8

[Test Method]

Male ICR mice (10 weeks old: Japan SLC, Inc.) were habituated for 5 days, and then divided into three groups based on body weight values. The mice were divided into a group (Example 7) of nine mice to which alcohol (2000 mg/kg) and *Garcinia indica* (500 mg/kg) were administered, a group (Comparative Example 7) of six mice to which alcohol (2000 mg/kg) and *Garcinia cambogia* (500 mg/kg) were administered, and a group (Comparative Example 8) of six mice to which alcohol (2000 mg/kg) and chlorella (500 mg/kg) were administered. As *Garcinia cambogia*, a powder obtained by extracting an extract from pericarps with water and drying the extract was used, and as chlorella, a powder obtained by concentrating a chlorella culture medium and drying the concentrated chlorella culture medium was used.

The alcohol was prepared to reach 12.5% (v/v) using physiological saline in the same manner as in Example 6, After one hour after the start of the light period (8:30 to 20:30), the alcohol was intraperitoneally administered (20 mL/deg), and 6 hours later, *Garcinia indica*, *Garcinia cambogia*, or chlorella was forcibly orally administered (10 mL/kg). After 3 hours after the forced oral administration, the mice were subjected to an open field test for 5 minutes. In the open field test, a video was recorded by a digital camera, and an analysis was performed.

[Open Field Test]

Index 1 (the number of times of movement) was evaluated in the same manner as in Example 6. A 0-hour open field test was performed on the day before this test, that is, before the administration of the alcohol and the test substances in Example 7, Comparative Example 7, or Comparative Example 8.

TABLE 8

| Test group | Number of times of movement (relative value when setting 0-hour as 100) |
|---|---|
| Example 7 (*garcinia indica* group_500) | 48.7 |
| Comparative Example 7 (*garcinia cambogia* group_500) | 33.2 |
| Comparative Example 8 (*chlorella* group_500) | 35.9 |

[Results]

The test results are shown in Table 8. For the group (Example 7 to which alcohol and *Garcinia indica* were administered, a relative value of the number of times of movement relative to 0-hour when alcohol was not administered was increased as compared with the group (Comparative Example 7) to which alcohol and *Garcinia cambogia* were administered. For Example 7, a relative value of the number of times of movement relative to 0-hour when alcohol was not administered was increased as compared with the group (Comparative Example 8) to which alcohol and chlorella were administered. Based on this result, it was found that a degree of decrease in the number of times of movement caused by a hangover was lower in the group to which *Garcinia indica* was administered than in the group to which *Garcinia cambogia* was administered and the group to which chlorella was administered, Therefore, it was found that *Garcinia indica* is more effective for recovering from and/or alleviating a hangover than *Garcinia cambogia* and chlorella.

Production Example

[Preparation of Crushed Product of *Garcinia indica*]

Fruits of *Garcinia indica* were pulverized to obtain a powder, and the powder was sieved to obtain a crushed product of *Garcinia indica*.

Production Examples 1 to 5: Granules

According to a formulation shown in Table 9, an extract or a crushed product of *Garcinia indica* was mixed with other raw materials, followed by performing fluidized bed granulation using a granulator, and granules described in Production Examples 1 to 5 were produced. *Garcinia indica* is less likely to adhere to the granulator, and cleaning of the granulator is easy. The granules described in Production Examples 1 to 5 may be ingested in an amount of, for example, 2 g per day, and may be ingested by being dissolved in a solvent such as 100 mL of water, or may be ingested as it is without being dissolved. The contents in the prescription shown in Table 9 may be ingested as powders without granulation, but a granulated product is preferable because the granulated product has improved hydrophilicity to water and saliva and is ingested easily. In addition, the granules of any of Production Examples 1 to 5 are effective for recovering from and/or alleviating a hangover. Unless otherwise specified, "%" indicating a blending ratio in Tables 9 to 14 means a ratio (mass %) on a mass basis, and a blank indicates that the corresponding ingredient is not contained. In Tables 9 to 14, "%" in "60% hydrous ethanol" means a ratio on a volume basis (volume %).

TABLE 9

| Granules | Production Example 1 | Production Example 2 | Production Example 3 | Production Example 4 | Production Example 5 |
|---|---|---|---|---|---|
| *Garcinia indica* extract (extraction solvent: ethanol) | 5.00% | | | | 5.00% |
| *Garcinia indica* extract (extraction solvent: 60% hydrous ethanol) | | 5.00% | | | |
| *Garcinia indica* extract (extraction solvent: water) | | | 5.00% | | |
| Crashed product of *garcinia indica* | | | | 5.00% | |
| Xanthan gum | 5.00% | 5.00% | 5.00% | 5.00% | 5.00% |
| Citric acid | 3.00% | 3.00% | 3.00% | 3.00% | |
| Sodium citrate | | | | | 3.00% |
| Sucralose | 0.50% | 0.50% | 0.50% | 0.50% | 0.50% |
| Flavor or fragrances | 2.00% | 2.00% | 2.00% | 2.00% | 2.00% |
| Vitamin mix | 1.00% | 1.00% | 1.00% | 1.00% | 1.00% |
| Maltose | 33.00% | 33.00% | 33.00% | 33.00% | 33.00% |
| Polydextrose | 25.00% | 25.00% | 25.00% | 25.00% | 25.00% |
| Indigestible dextrin | 25.00% | 25.00% | 25.00% | 25.00% | 25.00% |
| Cyclodextrin | 0.50% | 0.50% | 0.50% | 0.50% | 0.50% |

Production Examples 6 to 12: Tablets

According to a formulation shown in Table 10, an extract or a crushed product of *Garcinia indica* was mixed with other raw materials, and then the mixture was tableted using a rotary tablet press to produce tablets of Production Examples 6 to 12. *Garcinia indica* is less likely to adhere to a tablet press or a mixer, and cleaning of the machines is easy. The tablets were produced with a tablet diameter of 8 mmφ, a tablet thickness of 4.5 mm, a weight of 300 mg, and a hardness of 5 kgf or more. The tablets described in Production Examples 6 to 12 may be ingested in an amount of, for example, 1 to 2 tablets per day, and may be ingested together with 100 mL of water or the like. In addition, tablets of any of Production Examples 6 to 12 are effective for recovering from and/or alleviating a hangover.

TABLE 10

| Tablets | Production Example 6 | Production Example 7 | Production Example 8 | Production Example 9 | Production Example 10 | Production Example 11 | Production Example 12 |
|---|---|---|---|---|---|---|---|
| *Garcinia indica* extract (extraction solvent: ethanol) | 10% | 10% | | | | 10% | 10% |
| *Garcinia indica* extract (extraction solvent: 60% hydrous ethanol) | | | 10% | | | | |
| *Garcinia indica* extract (extraction solvent: water) | | | | 10% | | | |
| Crashed product of *garcinia indica* | | | | | 10% | | |
| Citric acid | | | | | | 3% | |
| Sodium citrate | | | | | | | 3% |
| Maltose | 25% | 25% | 25% | 25% | 25% | 25% | 25% |
| Reduced maltose | 25% | 25% | 25% | 25% | 25% | 25% | 25% |
| Reduced palatinose | 22% | 22% | 22% | 22% | 22% | 19% | 19% |
| Cellulose | 15% | 15% | 15% | 15% | 15% | 15% | 15% |
| Silicon dioxide | 1% | 1% | 1% | 1% | 1% | 1% | 1% |
| Calcium stearate | 2% | | 2% | 2% | 2% | 2% | 2% |
| Sucrose fatty acid ester | | 2% | | | | | |

Production Examples 13 to 18: Soft Capsules

According to a formulation shown in Table 11, an extract or a crushed product of *Garcinia indica* and other raw materials were put into an emulsification kettle to prepare a liquid content of soft capsules. Further, the liquid content was enclosed with a coating film containing gelatin and glycerin to prepare the soft capsules. *Garcinia indica* is less likely to adhere to an emulsification kettle or a stirring blade which is used during the emulsification, and cleaning of the equipment is easy. Soft capsules were produced with 400 mg per capsule. The soft capsules described in Production Examples 13 to 18 may be ingested in an amount of, for example, 1 to 2 capsules per day, and may be ingested together with 100 mL of water or the like. In addition, soft capsules of any of Production Examples 13 to 18 are effective for recovering from and/or alleviating a hangover.

Production Examples 25 to 29: PET Beverages

According to a formulation shown in Table 13, an extract or a crushed product of *Garcinia indica* was mixed with other raw materials to obtain a liquid agent, and a PET container was filled with the liquid agent to produce PET beverages. *Garcinia indica* is less likely to adhere to a mixer or a filling machine, and cleaning of the machines is easy. The PET beverages were produced with 150 mL, per beverage. The PET beverages of Production Examples 25 to 29 may be ingested in an amount of, for example, 1 to 3 beverages per day. In addition, PET beverages of any of Production Examples 25 to 29 are effective for recovering from and/or alleviating a hangover.

TABLE 11

| Soft capsules | Production Example 13 | Production Example 14 | Production Example 15 | Production Example 16 | Production Example 17 | Production Example 18 |
|---|---|---|---|---|---|---|
| *Garcinia indica* extract (extraction solvent: ethanol) | 10% | | | | 10% | 10% |
| *Garcinia indica* extract (extraction solvent: 60% hydrous ethanol) | | 10% | | | | |
| *Garcinia indica* extract (extraction solvent: water) | | | 10% | | | |
| Crushed product of *garcinia indica* | | | | 10% | | |
| Citric acid | | | | | 3% | |
| Sodium citrate | | | | | | 3% |
| Safflower oil | 80% | 80% | 80% | 80% | 77% | 77% |
| Glycerin fatty acid ester | 5% | 5% | 5% | 5% | 5% | 5% |
| Beeswax | 5% | 5% | 5% | 5% | 5% | 5% |

Production Examples 19 to 24: Hard Capsules

According to a formulation shown in Table 12, an extract or a crushed product of *Garcinia indica* was mixed with other raw materials, and the mixture was enclosed with a coating film containing gelatin or hydroxypropyl cellulose, thereby producing hard capsules. *Garcinia indica* is less likely to adhere to a mixer or a filling machine, and cleaning of the machines is easy. The hard capsules were produced with 300 mg per capsule. The hard capsules described in Production Examples 19 to 24 may be ingested in an amount of, for example, 1 to 2 capsules per day, and may be ingested together with 100 mL of water or the like. In addition, hard capsules of any of Production Examples 19 to 24 are effective for recovering from and/or alleviating a hangover.

TABLE 13

| PET beverages | Production Example 25 | Production Example 26 | Production Example 27 | Production Example 28 | Production Example 29 |
|---|---|---|---|---|---|
| *Garcinia indica* extract (extraction solvent: ethanol) | 5.00% | | | | 5.00% |
| *Garcinia indica* extract (extraction solvent: 60% hydrous ethanol) | | 5.00% | | | |
| *Garcinia indica* extract (extraction solvent: water) | | | 5.00% | | |
| Crushed product of *garcinia indica* | | | | 5.00% | |

TABLE 12

| Hard capsules | Production Example 19 | Production Example 20 | Production Example 21 | Production Example 22 | Production Example 23 | Production Example 23 | Production Example 24 |
|---|---|---|---|---|---|---|---|
| *Garcinia indica* extract (extraction solvent: ethanol) | 10% | | | | 10% | 10% | 10% |
| *Garcinia indica* extract (extraction solvent: 60% hydrous ethanol) | | 10% | | | | | |
| *Garcinia indica* extract (extraction solvent: water) | | | 10% | | | | |
| Crushed product of *garcinia indica* | | | | 10% | | | |
| Citric acid | | | | | 3% | | |
| Sodium citrate | | | | | | | 3% |
| Dextrin | 85% | 85% | 85% | 85% | | 82% | 82% |
| Cellulose | | | | | 85% | | |
| Lubricant | 5% | 5% | 5% | 5% | 5% | 5% | 5% |

TABLE 13-continued

| PET beverages | Production Example 25 | Production Example 26 | Production Example 27 | Production Example 28 | Production Example 29 |
|---|---|---|---|---|---|
| Vitamin mix | 0.50% | 0.50% | 0.50% | 0.50% | 0.50% |
| Citric acid | 0.25% | 0.25% | 0.25% | 0.25% | |
| Sodium citrate | | | | | 0.25% |
| Arginine | 4.00% | 4.00% | 4.00% | 4.00% | 4.00% |
| Valine | 3.50% | 3.50% | 3.50% | 3.50% | 3.50% |
| Glutamine | 2.50% | 2.50% | 2.50% | 2.50% | 2.50% |
| Aspartame | 0.05% | 0.05% | 0.05% | 0.05% | 0.05% |
| Acesulfame potassium | 0.05% | 0.05% | 0.05% | 0.05% | 0.05% |
| Spore forming lactic acid bacteria | 0.10% | 0.10% | 0.10% | 0.10% | 0.10% |
| Water | 84.05% | 84.05% | 84.05% | 84.05% | 84.05% |

Production Examples 30 to 34: Slurry Beverages

According to a formulation shown in Table 14, an extract or a crushed product of *Garcinia indica* was mixed with other raw materials to obtain a slurry liquid agent, and an aluminum pouch was filled with the slurry liquid agent to produce slurry beverages. *Garcinia indica* is less likely to adhere to a mixer or a filling machine, and cleaning of the machines is easy. The slurry beverages were produced with 150 mL per beverage. The slurry beverages of Production Examples 30 to 34 may be ingested in an amount of, for example, 1 to 3 beverages per day. In addition, slurry beverages of any of Production Examples 30 to 34 are effective for recovering from and/or alleviating a hangover.

TABLE 14

| Slurry beverages | Production Example 30 | Production Example 31 | Production Example 32 | Production Example 33 | Production Example 34 |
|---|---|---|---|---|---|
| *Garcinia indica* extract (extraction solvent: ethanol) | 5.00% | | | | 5.00% |
| *Garcinia indica* extract (extraction solvent: 60% hydrous ethanol) | | 5.00% | | | |
| *Garcinia indica* extract (extraction solvent: water) | | | 5.00% | | |
| Crushed product of *garcinia indica* | | | | 5.00% | |
| Citric acid | 0.25% | 0.25% | 0.25% | 0.25% | |
| Sodium citrate | | | | | 0.25% |
| Dextrin | 10.00% | 10.00% | 10.00% | 10.00% | 10.00% |
| Reduced palatinose | 10.00% | 10.00% | 10.00% | 10.00% | 10.00% |
| Xanthan gum | 2.00% | 2.00% | 2.00% | 2.00% | 2.00% |
| Guar gum | 1.00% | 1.00% | 1.00% | 1.00% | 1.00% |
| Potassium chloride | 0.10% | 0.10% | 0.10% | 0.10% | 0.10% |
| Calcium lactate | 0.10% | 0.10% | 0.10% | 0.10% | 0.10% |
| Magnesium chloride | 0.10% | 0.10% | 0.10% | 0.10% | 0.10% |
| Aspartame | 0.05% | 0.05% | 0.05% | 0.05% | 0.05% |
| Acesulfame potassium | 0.05% | 0.05% | 0.05% | 0.05% | 0.05% |
| Salt | 0.10% | 0.10% | 0.10% | 0.10% | 0.10% |
| Water | 71.25% | 71.25% | 71.25% | 71.25% | 71.25% |

Although the present invention has been described in detail with reference to specific embodiments, it is apparent to those skilled in the art that various changes and modifications can be made without departing from the spirit and scope of the present invention. The present application is based on Japanese Patent Application No. 2020-017492 filed on Feb. 4, 2020 and Japanese Patent Application No. 2020-204213 filed on Dec. 9, 2020.

INDUSTRIAL APPLICABILITY

The composition for recovering from and/or alleviating a hangover of the present invention has an excellent recovery and/or alleviation effect on a hangover, and thus has high industrial usefulness.

The invention claimed is:

1. A method for recovering from and/or alleviating a hangover, comprising:
    ingesting a composition containing *Garcinia indica*, so as to enable a human to recover from and/or alleviate a hangover.

2. The method according to claim 1, wherein the composition further contains an acidulant.

3. The method according to claim 1, wherein the ingestion is performed after appearance of a hangover symptom.

4. The method according to claim 1, wherein the composition contains the *Garcinia indica* in an amount of 0.0001 mass % or more and 80 mass % or less.

5. The method according to claim 2, wherein the composition contains the acidulant in an amount of 0.01 parts by weight or more and 50 parts by weight or less, relative to 1 part by weight of the *Garcinia indica*.

6. A method for recovering from and/or alleviating a hangover, comprising:
    administering *Garcinia indica* to a human, wherein said *Garcinia indica* is administered in a range of 0.001 mg per day to 1000 mg per day in terms of dry mass so as to enable the human to recover from and/or alleviate a hangover.

7. The method according to claim 6 wherein said administration of said *Garcinia indica* is in a range of 0.01 mg per day to 500 mg per day in terms of dry mass.

* * * * *